United States Patent Office 3,322,195
Patented May 30, 1967

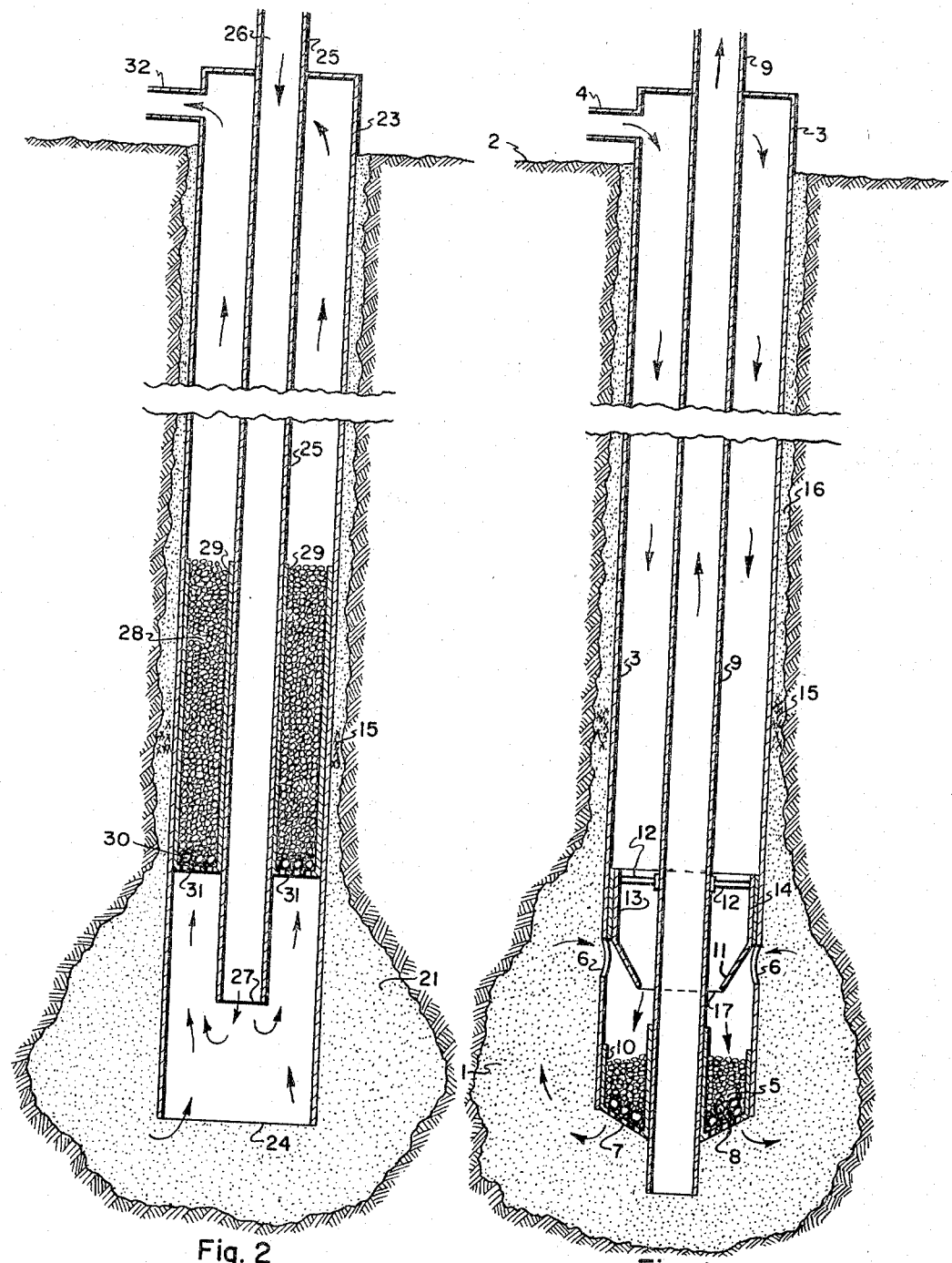

3,322,195
PROCESS AND APPARATUS FOR RECOVERY OF ADDITIONAL FUELS FROM OIL AND GAS WELLS
John A. Brown, Berkeley Heights, and Henry Berk, Westfield, N.J., assignors to Esso Research and Engineering Company, a corporation of Delaware
Filed Jan. 20, 1964, Ser. No. 338,828
11 Claims. (Cl. 166—38)

This invention is concerned with a method and means for producing methane-enriched fuel gases from natural gas hydrocarbons such as exist in subterranean oil and gas reservoirs to obtain economical recovery of additional valuable fuel products from such reservoirs. The method and means employed are capable of utilizing the natural conditions of the reservoir for increasing its energy content with low energy input and with a relatively small amount of degradation of chemical energy in obtaining the products recovered.

It is known that a number of recovery methods have been proposed and have been evaluated by laboratory and field tests. The recovery methods best known are classified as: (1) "Gas drives" in which hydrocarbon gases and liquifed hydrocarbon gases are injected, (2) "thermal-recovery" in which air is injected for combustion of a portion of the hydrocarbons, and (3) "water-flooding" in which water or other liquid flooding agents are injected. Such recovery methods are used to force oil and gas out of the reservoir in which natural pressure has become dissipated. More than half the oil and gas is left confined in the reservoir when the natural pressure therein reaches equilibrium with the outlet well pressure. The hitherto proposed recovery methods have many faults with respect to availability, costs of materials injected, energy input, equipment, and extent of recovery.

According to the present invention, the energy and chemical conditions existing in the subterranean oil and gas reservoirs are used with injected high-pressure steam in a catalytic conversion technique for converting hydrocarbon vapors inducted by the steam to form a gas product of high methane content. The gas product from the conversion in the reservoir can be used to augment the pressure therein and is a suitable medium for lifting or driving other hydrocarbon gases and liquids from the reservoir up through a venting duct or outlet well. The gas product has useful heating value due to its high methane content.

The present invention utilizes a catalytic reaction adapted for the conditions obtaining in the reaction of the higher molecular weight gaseous hydrocarbons with steam in the presence of methane and other intermediate conversion products, namely $H_2O$, $H_2$, CO and $CO_2$ to increase the concentration of $CH_4$ and the number of volatile gas molecules. This is accomplished by use of a nickel catalyst having appropriate activity which correlates to high nickel surface-areas, e.g. 20 to 60 square meters per gram of catalyst, a suitable proportion of steam, e.g. 1.5 to 5 lbs. $H_2O$ per lb. of hydrocarbon reactant, use of suitably low reaction temperatures in the range of about 600° to 925° F., and superatmospheric pressures, e.g. in the range of 4 to 100 atms. Various amounts of conversion are obtained depending on the space velocities, e.g. 1 to 20 lbs. of feed per lb. of catalyst per hour.

In typical petroleum oil and natural gas reservoirs the temperatures are in the range of 150° to about 300° F. or higher and gas pressures are in the range of 60 to 2000 p.s.i.g. or higher. The gaseous or volatile hydrocarbon components under pressure are mainly pariffinic $C_1$ to $C_8$ hydrocarbons. Methane is principally present in the gas withdrawn, because the higher boiling components condense out as liquids when the gas mixture is being brought up to the surface, especially after pressures become lowered with exhaustion of gas from the well. The conditions call for novel approaches to the problem of injecting fluids under sufficiently high pressures to augment the pressures existing in the underground reservoir and to effect the desired flow of fluids having value to above ground for recovery.

A variety of reactions occur simultaneously using the type of catalyst and conditions set forth, and there are a number of interesting results obtained, such as increased moles of products relative to moles of compounds in feed reacted and exothermic heat evolved by the reaction. The factor of particular importance is that the many intermediate reaction products including the methane, $CO_2$, CO, and $H_2$ do not prevent the reaction conversion of various hydrocarbons, such as ethane, propane, butane, pentane, hexane, heptane, octane, etc. to methane as an end product from taking place.

Although the exact mechanism of the reactions involved is more complicated, the principle reactions are represented for n-hexane in a simplified form as follows:

(1) $\quad C_6H_{14} + 6H_2O \rightarrow 6CO + 13H_2$ (2) $\quad 4CO + 12H_2 \rightarrow 4CH_4 + 4H_2O$ (3) $\quad 2CO + 2H_2O \rightarrow 2CO_2 + 2H_2$ (Net) $\quad C_6H_{14} + 4H_2O \rightarrow 4CH_4 + 3H_2 + 2CO_2$ It can be seen from the above equations that the stoichiometric net proportion of steam supplied for these reactions theoretically is 4 moles $H_2O$ per one mole of the hydrocarbon reactant and that the one mole of hexane plus a net of 4 moles of $H_2O$ leads to the formation of 4 moles $CH_4 + 3$ moles $H_2 + 2$ moles $CO_2$, or 9 moles of product from 4 moles of steam injected. The actual typical gas products obtained at above 70% conversion of n-hexane by reaction with steam at 700° F., have compositions represented as follows:

TABLE I

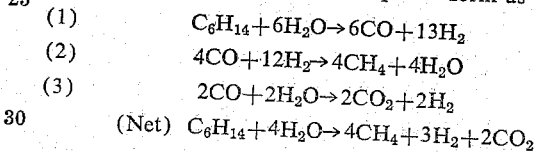

| Product Component: | (H$_2$O and C$_2$+Free Basis) Mole % Range in Product |
|---|---|
| CH$_4$ | 50 to 80 |
| H$_2$ | 28 to 12 |
| CO$_2$ | 20 to 17 |
| CO | 0 to 1 |

This data indicates how the principal reactions of the higher paraffins may take place. The reaction (2) can predominate over reaction (3) so that the moles of $CH_4$ formed is more than twice the number of moles of $CO_2$ formed.

A number of other reactions are possible, e.g.

(4) $\quad CH_4 + H_2O \leftrightharpoons CO + 3H_2$ (5) $\quad CH_4 + CO_2 \leftrightharpoons CO_2 + 4H_2$ (6) $\quad CH_4 \leftrightharpoons C + 2H_2$ (7) $\quad CH_4 + 3H_2O \leftrightharpoons CO + CO_2 + 3H_2$ (8) $\quad C_6H_{14} + 12H_2O \leftrightharpoons 6CO_2 + 19H_2$ (9) $\quad C_6H_{14} \leftrightharpoons C_6H_{12} + H_2$

(10) $\quad C_6H_{14} \leftrightharpoons C_5H_{10} + CH_4$

(11) $\quad C_6H_{14} \leftrightharpoons C_4H_8 + C_2H_6$

(12) $\quad C_6H_{14} \leftrightharpoons C_3H_6 + C_3H_8$

(13) $\quad C_xH_x + H_2 \leftrightharpoons C_xH_{x+2}$

However, despite all the possible reactions including (1) to (13), the reversible reactions and others, the surprising observation made is that the higher molecular weight hydrocarbons, particularly $C_5$ to $C_8$ can be made to react with $H_2O$ mainly in accordance with the Equation 1 accompanied by the reactions shown in Equations 2 and 3 even when the concentration of $CH_4$ and other normally gaseous hydrocarbons is high in the reaction zone. This is very significant for it means that the feed to the catalytic reaction zone can contain high amounts of the normally gaseous hydrocarbons, e.g. $C_1$ to $C_4$ hydrocarbons without interfering with the desired reactions (1), (2) and (3); and, accordingly, the catalytic reaction can take place in the reservoir with a feed mixture containing the various hydrocarbons in proportions they have in the reservoir using the reaction conditions herein described, at suitably low reaction temperatures in the range of 600° to 925° F. in the presence of a suitably active catalyst.

A suitably active nickel catalyst should have a relatively high nickel surface-area as previously mentioned. Such catalysts have been formed by coprecipitation of nickel and aluminum with hydroxide, carbonate and basic carbonate ions, e.g. by adding ammonium bicarbonate to an aqueous solution of nickel nitrate and aluminum nitrate. The precipitate obtained in this manner has the nickel compounds interspersed with the precipitated aluminum compounds. Preferably a promoter is mixed with the wet precipitate of the nickel and aluminum compounds after which the resulting mixture is dried at a temperature preferably in the range of 200° to 400° F., calcined in air at a temperature in the range of 600° to 925° F., and then activated by treatment with hydrogen at a temperature below 925° F., e.g. preferably 600° to 750° F. In the resulting solid, the atom ratio of promoting metal to nickel is in the range of 0.001 to 1.0. The atom ratio of Ni to Al may be 0.4 to 1.3. Examples of suitable promoters are Ba, Cs, Sr, La, K, Ce, Y, Fe and possibly others. The promoters have to be empirically determined since some metals act as inhibitors or anti-catalysts, e.g. Na. The nickel may also be mixed with silicates and silica in place of alumina and used with the indicated promoters. The promoting metals are added as compounds, e.g. hydroxides, carbonates, or nitrates, but after the calcination in air they may be present combined as oxides, aluminates, silicates, etc. Such catalysts have been found to be adequately effective as they can give over 90% conversion of n-hexane in the reaction at 700° F. for over 200 hours with signs of only deactivation. The best catalysts of this type are capable of giving above 90% conversion for well over 1000 hours while keeping the temperature properly in the range of 600° to 925° F. The amount of interspersed $Al_2O_3$ or $SiO_2$ present in the mixed catalyst makes the catalyst have a total surface area of 100 to 300 square meters per gram.

The method and the means for employing the method will be described with reference to the accompanying drawing, but it is to be understood various modifications can be made within the scope of the invention.

In FIGURES 1 and 2 of the drawing are diagrammatic views in vertical section of an oil field and apparatus in which the invention may be practiced.

FIGURE 1 of the drawing illustrates an oil or natural gas reservoir 1 containing residual oil surrounded by porous rock, sand stone, or lime stone. The ground surface is 2. A well casing 3 extends from above the ground level 2 down to the reservoir cavity 1. The upper end of casing 3 has an inlet 4 for the introduction of steam. A bottom portion of casing 3 surrounds a bed 5 of the catalyst below orifices 6 in the casing. The catalyst 5 is supported above a perforated plate 7, and above the plate 7 may be placed loose asbestos fibers 8, inert solids such as pumice, ceramic pebbles, etc., or mixtures of such materials to support the catalyst particles while permitting the gas products to exit through perforations in plate 7, then out through the bottom open end of casing 3. A central pipe 9 concentric with casing 3 extends to below a container 10 which holds the catalyst 5 and provides a vent duct through its interior. As illustrated, a frustrum shaped valve and steam jet forming injecting nozzle 11 are attached through arm members 12 to the exterior of pipe 9 so that the nozzle device 11 may be raised or lowered with the raising and lowering of pipe 9 for obtaining an adjustment of flow of gases. Similarly, the catalyst container 10 with its perforated bottom plate 7 may be attached to pipe 9. The device 11 of frustrum shape has a cylindrical extension 13 open at the top to receive downflowing steam and with a surrounding packing 14 that can slide on the interior surface of the casing 3. The packing may be a heat resistant material such as Teflon or other material of such nature. The casing 3 has a surrounding cement plug 15 to prevent seepage between the casing and drilled hole wall 16.

For the operation of the apparatus shown in FIGURE 1, high pressure steam is passed from inlet 4 down through the casing 3 in the annulus surrounding pipe 9 and on reaching the bottom edge 17 of the jet forming nozzle 11, the steam is increased in its velocity and inducts gaseous hydrocarbons through the entrance of the orifice 6 to form a flowing steam and hydrocarbon mixture which then passes down through the catalyst bed containing the highly active nickel catalyst. In the catalyst bed the desired reaction temperatures are maintained as previously described. The gaseous products containing a highly proportion of $CH_4$ and $CO_2$ with excess steam leave the catalyst bed through the catalyst retaining material 8, then through perforations in the bottom plate 7. The reaction is conducted to form a sufficient pressure to add to the natural pressure in the reservoir being serviced so that finally a pressure in the reservoir is sufficient for lifting gas or gas and oil up through the venting duct 9 to above the ground surface. Thus, hydrocarbon gases, oil and methane may be recovered from the reservoir. Recycling of gaseous conversion products into admixture with gaseous hydrocarbons passed through the catalyst bed.

In FIGURE 2, the gas and oil reservoir at the bottom of the well is represented as 21 below the ground level 2. The casing 23 extends from above the ground level 2 to the reservoir cavity 21 where the casing 23 has an inlet opening 24 through which the gaseous hydrocarbons rise. The central tube 25 extends from its inlet 26 above the ground level to a bottom outlet 27 and is concentric with the casing 23. High-pressure steam is forced down through the inlet 26 of tube 25 to flow through the exit 27 where the steam mixes with the gaseous hydrocarbons rising up toward a bed of catalyst 28 held in container 29 located in the annulus between the casing 23 and the steam inlet tube 25. The catalyst granular particles, e.g. 1 to 10 mm. in diameter, or compacted into larger pellets, may be retained over a filtering material 30 such as pieces of ceramic pebbles, pumice, or such inert solids mixed with asbestos fibers supported on a perforated bottom plate 31 of container 29. With establishment of sufficient pressure, the gaseous hydrocarbons mixed with the steam pass up through the perforated plate, the filtering material and the bed of catalyst, and in doing so undergo reaction with the evolution of heat, creating an updraft of the heated mixed gaseous products which rise to the upper part of the casing 23 to be withdrawn therefrom through the outlet 32. The catalyst container 29 may be attached to tube 25 to be raised and lowered therewith.

The apparatus illustrated in FIGURE 2 is in simplified form, but it is to be understood that various other means may be used to implement controlled flow of materials. It is possible to have other arrangements such as having the catalyst bed in the central tube and using the annular space between the central tube and the casing for injecting steam down into the bottom of the well.

The composition of the natural gases in the underground reservoirs is variable depending on pressures and temperatures which have a relationship to the distance under the surface. The gaseous mixtures are complex and are considered as being in equilibrium with liquids. The exact compositions cannot be judged exactly from the composition of casing head natural gas but have a relationship thereto. The content of higher molecular weight paraffins of the gas in situ underground depends on a number of other factors including the age of the well. In general, a casing-head gas is considered to contain from 45 to above 90 mole percent $CH_4$, 1 to 40 mole percent of $C_2$ to $C_4$ paraffins and 1 to 7 mole percent of pentanes and heavier. Down in the reservoir the proportion of the higher paraffins increases. In aged wells a substantial amount of the lower molecular weight gases have been removed.

Test analyses now are found to show that the paraffinic hydrocarbons higher boiling than methane can be converted in the presence of steam to the lower boiling hydrocarbons including methane using high surface-area nickel catalysts at temperatures of 600° to 925° F. under high atmospheric pressures, even though the reaction mixture introduced into contact with the catalyst initially has a high methane content or a high content of $C_1$ to $C_4$ paraffin hydrocarbons relative to the higher molecular weight $C_5+$ paraffins, or even if conversion products ($CO$, $CO_2$, $H_2O$) are present. This reaction is for the most part exothermic and is essentially carried out at temperatures as low as practical in the range of 600° to 925° F. This is an unusual type of reaction in which the lower molecular weight hydrocarbons and intermediate products do not interfere with the desired formation of the methane-rich gas as illustrated in the following examples.

*Example 1*

In test runs nickel interspersed with $Al_2O_3$ with a promoter, e.g. $K_2O$, was used as the catalyst. The catalyst was formed by coprecipitation of nickel and aluminum as hydroxides, carbonates and basic carbonates followed by drying of the precipitate containing admixed potassium hydroxide, then calcining the dried precipitate in air at a temperature in the range of 600° to 925° F., followed by activation of the calcined material by treatment with hydrogen at a temperature in the range of 600° to 925° F. Similar catalysts were made by coprecipitating nickel with metasilicate on kieselguhr. Using such catalysts, the steam hydrocarbon mixtures contacted with the catalyst were made to contain 5 to 9 moles of $CH_4$ per mole of $C_2+$ hydrocarbons with 6 to 10 moles of $H_2O$ vapor. As these mixtures were made to proceed through the catalyst bed, analyses showed that there was substantial amount of conversion of the $C_2+$ hydrocarbons (ethane up through octane) and that the large proportion of methane present did not diminish the selective formation of $CH_4$ from the higher boiling hydrocarbons in that the proportion of methane increased linearly as the reaction mixture proceeded through the bed. The test data thus clearly indicated that there is a progressive decomposition of the higher hydrocarbons toward the formation of methane accompanied by the formation of equilibrium proportions of $CO_2$ and $H_2$ upon reaching over 70% conversion of the $C_2+$ hydrocarbons. Thus, it has been demonstrated that the complex mixture of hydrocarbons of high $CH_4$ content undergoes a desired reaction toward formation of more methane, carbon dioxide, and hydrogen in the reactions which are mainly exothermic. To some extent $C_2$ to $C_4$ hydrocarbons are also formed from the lighter paraffins to be present in the gas product, as where the conversion with respect to the higher paraffins and the $C_2$ to $C_4$ paraffins is lower, e.g. 40 to 70% conversion. In any event, an advantage is gained from increased volume of gas product, its content of more volatile components, and higher temperature for activating the flow of materials from a natural gas and oil reservoir.

Preferred catalysts used as described contained 40 to 60 wt. percent Ni interspersed with 60 to 40 wt. percent $Al_2O_3$ or $SiO_2$ on a dry basis. From 1 to 6 wt. percent of the promoter metal-containing compound was admixed with the precipitate before the drying and calcining. The coprecipitation of the nickel with Al compounds from an aqueous solution of Ni and Al nitrates by $NH_4HCO_3$ eliminates the need of washing and the promoter compound may be a nitrate which becomes decomposed during the calcining. The promoter metal may finally be present in a combined form, e.g., as oxide or carbonate. The activation by treatment with hydrogen reduces the nickel oxide present in the catalyst. After the activation the catalyst is preferably kept out of contact with $O_2$ or air, and can be protected by $H_2$, hydrocarbon gases or by hydrocarbon film which can keep out gas until the catalyst is in place for use.

A further significant factor in the successful utilization of the methane producing process by reactions of the substances as they exist in a natural reservoir is the ability of these reactions to proceed toward completion (high $CH_4$ yield) even when the mixed substances entering into contact with the catalyst contain high amounts of intermediate and end products, e.g., $H_2$, $CO_2$, $CO$, $H_2O$, $C_2+$ paraffins, and olefins, with $CH_4$. The tolerance of the reaction for the presence of high amounts of intermediate and end products is demonstrated by the following example.

*Example 2*

Test run data was obtained using high activity nickel catalysts, e.g., $Ni-K-Al_2O_3$, for contact with mixtures as shown in the following table.

TABLE II $Ni-K-Al_2O_3$ catalyst of 25 m²/g. Ni surface-area:
Reaction temperatures, 680° to 820° F.
Inlet to outlet feed temperature, 700° to 720° F.
Space velocity, 3 to 10 lbs. feed/lb. catalyst /hr.
Reactor, Steel
Percent Conversion of $C_2+$ hydrocarbons, above 80%

| Components of Mixture | Mole Fraction of Feed | Mole fraction in Gas Product |
|---|---|---|
| $H_2O$ | 0.37 | 9.31 |
| $CH_4$ | 0.21 | 0.43 |
| $CO_2$ | 0.15 | 0.20 |
| $H_2$ | 0.15 | 0.05 |
| $CO$ | <0.05 | <0.01 |
| $C_2+$[1] | <0.07 | <0.01 |

[1] The $C_2+$ hydrocarbons contain a major proportion of ehtane, propane, n-butane with a minor proportion of other $C_2+$ hydrocarbons ranging up to $C_8$ paraffins.

The quantities in the table are average figures to the closest hundredths of a mole fraction, and they indicate the tendency for the concentration of methane to increase while the concentrations of other components decrease except for the concentration of the $CO_2$ as the reaction mixture flows through the reaction zone in contact with the catalyst.

Considering that the $C_2$ to $C_8$ hydrocarbon components have on the average a composition corresponding to propane $C_3H_8$, the intermediate reactions $(a)$, $(b)$, $(c)$, $(d)$, and over-all net reaction $(e)$ may be expressed by the following equations:

$(a)$ $\quad C_3H_8 + 3H_2O \rightarrow 3CO + 7H_2$
$(b)$ $\quad 2CO + 6H_2 \rightarrow 2CH_4 + 2H_2O$
$(c)$ $\quad CO + H_2O \rightarrow CO_2 + H_2$
$(d)$ $\quad \frac{1}{2}CO_2 + 2H_2 \rightarrow \frac{1}{2}CH_4 + H_2O$ $(e)$ $\quad C_3H_8 + H_2O \rightarrow 2\frac{1}{2}CH_4 + \frac{1}{2}CO_2$ The resulting net reaction $(e)$ is in reasonable agreement with the data shown in Table II with respect to the formation of $CH_4$ in high yield and formation of some $CO_2$ from the other components, which become diminished. The $CO$, $H_2$, $CO_2$ and $H_2O$ thus may be intermediate products or may be present initially with the $C_2+$ hydrocarbon reactants, e.g., ethane, propane, butane, and higher paraffins. A net increase in volume of products is also indicated with respect to the combined volume of the hydrocarbon reactants and $H_2O$.

Thus, the data analyzed is meaningful in substantiating the operability of the process for obtaining an increased volume of methane-enriched gas products from mixtures of natural gas hydrocarbons present in a reservoir even when such hydrocarbons are in mixtures that contain various amounts of $CH_4$, CO, $H_2$, $CO_2$ and $H_2O$. On the basis of the net reaction of the $C_2+$ hydrocarbons indicated as of $C_3H_8$ average composition, approximately 2½ lbs. of $H_2O$ is required stoichiometrically with 1 lb. of these hydrocarbons, however, an excess of $H_2O$ is preferably used.

The natural gas hydrocarbons can be mixed with injected steam to flow once through a bed of the catalyst arranged as shown in FIGURE 2 or the product mixture containing $CH_4$, $CO_2$, CO, $H_2O$ with admixed gaseous hydrocarbons and steam can be fed back through a catalyst bed as shown in FIGURE 1, where a portion of the product gas is recycled, the other portion of the product being made to flow up through an educator 9 for recovery.

The present method of methane-rich gas recovery can be used in conjunction with other secondary recovery methods, e.g., hydrocarbon gas injection or partial combustion.

The methane-rich gas gathered by the present recovery method may be treated to remove condensible hydrocarbons, $H_2O$, and $CO_2$. The methane-rich gas can be used as a high heating value gas or for chemical processes, e.g., as a feed for producing hydrogen.

The present invention is not intended to be limited with respect to the use of any particular catalyst, because suitable catalysts are of a type known prior to this invention.

In principle, the present invention shows that despite the apparent complexities of compositions encountered and of various reactions for the many components involved, the formation of the desired methane-rich product is feasible without difficulties of controlling the operation even though the desired reactions take place down in an underground reservoir remote from the ground surface.

The invention described is claimed as follows:

1. Method of forming and recovering a gas product of enriched methane content from natural gas hydrocarbon components in a subterranean reservoir, which comprises reacting steam with $C_2+$ hydrocarbon components of natural gas containing principally methane, ethane, propane, and butane in the presence of a highly active nickel catalyst at temperatures in the range of 600° to 925° F. so that the paraffins heavier than the methane are decomposed to form $H_2$, CO, $CO_2$, and $H_2O$ as intermediates with $CH_4$ as a principal end product in the subterranean natural gas reservoir, and recovering the resulting gas product of increased methane content.

2. The method of claim 1, in which $C_2+$ hydrocarbon components in natural gas containing principally methane are reacted with steam present in admixed CO, $CO_2$, $H_2$, to form the gas product of increased methane content with increased $CO_2$ content and with diminution of CO, $H_2$, and $H_2O$.

3. The method of forming and recovering a gas product of enriched methane content from natural gas hydrocarbon components present in a subterranean reservoir, which comprises injecting steam under pressure into the natural gas reservoir to produce therein a mixture of the natural gas with the steam, passing said mixture through a bed of highly active nickel catalyst which at low temperatures in the range of 600° to 925° F. decomposes $C_2+$ hydrocarbons to form $H_2$, CO, $CO_2$, and $H_2O$ as intermediate products and principally $CH_4$ with $CO_2$ as end gas products under sufficient pressure to force the resulting gas products with associated hydrocarbons to flow up through a venting conduit for recovery from the reservoir.

4. The method of claim 3 in which the mixture of natural gas and injected steam is forced to pass through the bed of catalyst as an upflow stream to form the end gas products which then flow up through the venting conduit for recovery.

5. The method of claim 3 in which the mixture of injected steam and natural gas is forced to flow down through a bed of the catalyst in producing said gas products which flow up through the venting conduit.

6. The process for recovery of hydrocarbons from a hydrocarbon oil-bearing subterranean geological formation which comprises introducing steam under pressure down through a conduit into admixture with gaseous hydrocarbons present in said formation to obtain a resulting mixture of the steam with said hydrocarbons at a temperature of 600° to 750° F., passing said mixture into and through a bed of active nickel catalyst located close to where said mixture is formed so that the $C_2+$ paraffins in said mixture are decomposed to form CO, $H_2$, $CO_2$, and $H_2O$ as intermediate products and mainly $CH_4$ with $CO_2$ as end gas products at temperatures of 600° to 925° F. with evolution of heat and increase of gas volume, and drawing off hydrocarbons forced to flow with said end gas products from the formation through a conduit to above ground level.

7. Apparatus for recovery of hydrocarbons from oil and gas wells, comprising in combination a steam inlet duct means for passing steam into gaseous hydrocarbons in a subterranean oil and gas reservoir so as to produce a flowing mixture of the steam with the gaseous hydrocarbons, means holding a bed of catalyst solids in the path of said flowing mixture as it is produced in the reservoir, said means holding the catalyst having an inlet for flowing the mixture of the steam with the gaseous hydrocarbons into contact with the catalyst solids and an outlet for gaseous reaction products leaving the catalyst bed, and a duct means for withdrawing hydrocarbons forced to flow with said gaseous reaction products from the subterranean reservoir to above ground.

8. Apparatus as defined in claim 7, in which the inlet duct means for passing steam into gaseous hydrocarbons in the subterranean reservoir includes a steam injection nozzle of frustrum shape where said gaseous hydrocarbons are inducted from the reservoir and mixed with a jet of the steam injected from said nozzle to form the flowing mixture of the steam with the gaseous hydrocarbons forced to flow down through the bed of catalyst solids.

9. Apparatus as defined in claim 7, in which the duct means for withdrawing hydrocarbons with said gaseous reaction products from the subterranean reservoir to above ground is a central pipe, a valve and nozzle means attached to the exterior of said central pipe for raising and lowering with the central pipe, said valve and nozzle means sliding on the interior surface of a concentric casing which has orifices through which gaseous hydrocarbons are inducted from the reservoir and mixed with a jet of steam from the nozzle to produce the flowing mixture of the steam with the gaseous hydrocarbons which then flows into contact with the catalyst solids.

10. Apparatus as defined in claim 7, in which a central tube extending from its above-ground inlet to its bottom outlet in the reservoir is the steam inlet duct means, a well casing concentric with said central tube to form an annulus therewith to establish the duct means for withdrawing hydrocarbons forced to flow from the reservoir with gaseous reaction products to above ground, and said means holding a bed of catalyst solids being a container located in said annulus where steam passed from the bottom outlet of the central tube into gaseous hydrocarbons of the reservoir produces the mixture of the steam with the gaseous hydrocarbons, which is then made to flow upwardly into contact with the catalyst solids to form said gaseous reaction products.

11. Apparatus as defined in claim 7, in which the means for holding a bed of catalyst solids is attached to a central tube concentric with a well casing so that the catalyst bed can be lowered to a position near the reservoir by lowering the central tube inside the well casing, said central tube providing the steam inlet duct means, and said well casing spaced from the central tube providing space for the means holding the catalyst bed and providing the duct for withdrawing hydrocarbons from the reservoir mixed with steam and for withdrawing gaseous reaction products formed in the catalyst bed by catalytic reaction of the steam with the gaseous hydrocarbons.

References Cited

UNITED STATES PATENTS

| | | | |
|---|---|---|---|
| 2,423,674 | 7/1947 | Agren | 166—40 X |
| 2,721,122 | 10/1955 | Pettyjohn et al. | 48—214 X |
| 2,759,806 | 8/1956 | Pettyjohn et al. | 48—214 X |
| 2,860,959 | 11/1958 | Pettyjohn et al. | 48—214 X |
| 2,969,226 | 1/1961 | Huntington | 166—11 X |
| 3,107,728 | 10/1963 | Kehn | 166—59 |
| 3,127,935 | 4/1964 | Poettmann et al. | 166—11 |

FOREIGN PATENTS 511,768    8/1939    Great Britain.

CHARLES E. O'CONNELL, *Primary Examiner.*

S. J. NOVOSAD, *Assistant Examiner.*